May 17, 1938.   J. MIHALYI   2,117,971
CAMERA SHUTTER
Filed Oct. 30, 1936   6 Sheets-Sheet 3
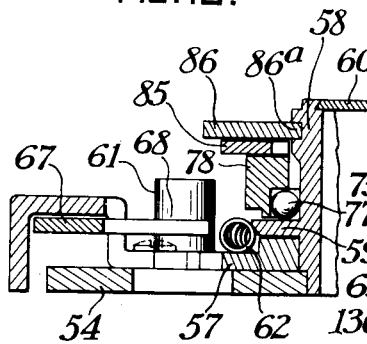
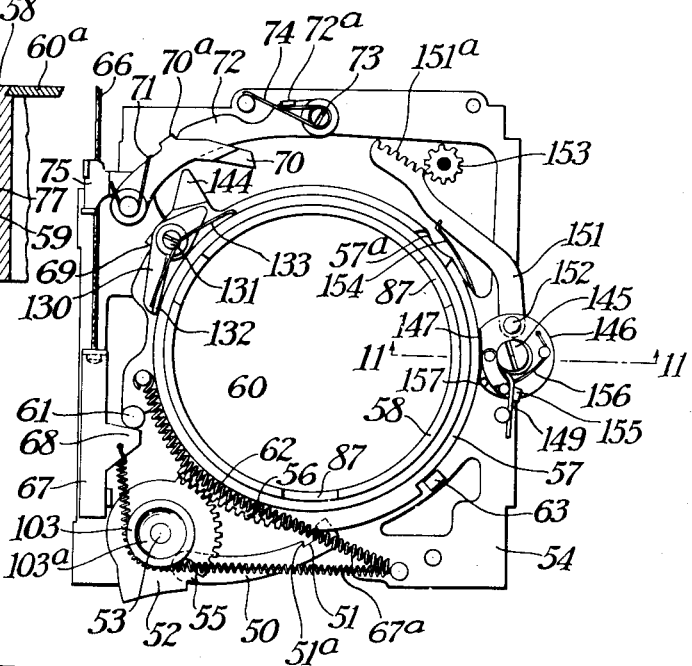
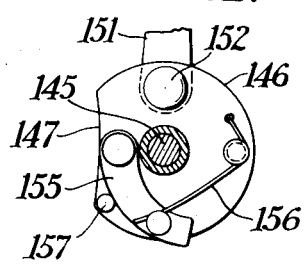
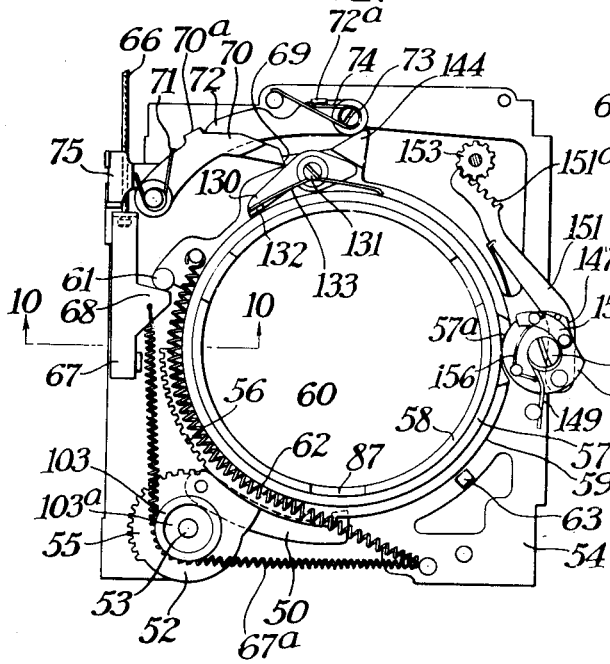
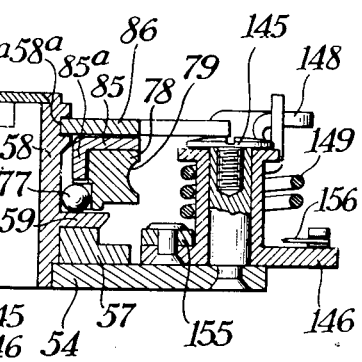
INVENTOR.
Joseph Mihalyi
BY
ATTORNEYS May 17, 1938.    J. MIHALYI    2,117,971
CAMERA SHUTTER
Filed Oct. 30, 1936    6 Sheets-Sheet 4
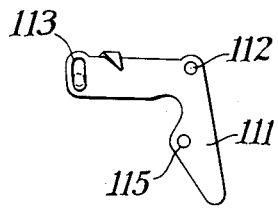
FIG. 15.
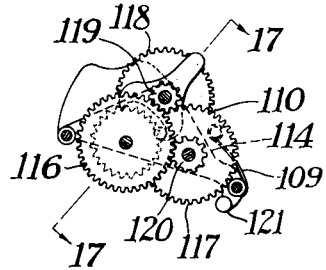
FIG. 16.
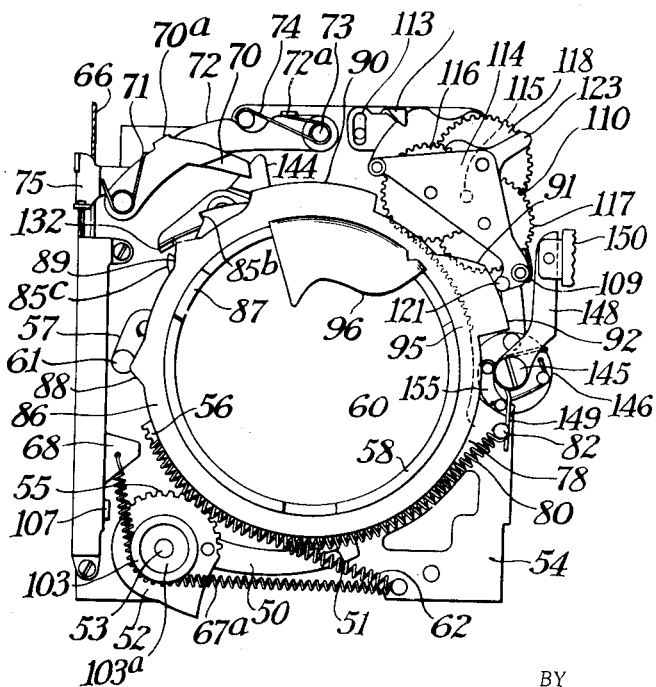
FIG. 13.
FIG. 14.
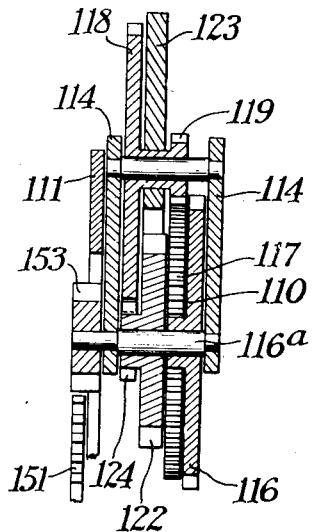
FIG. 17.
INVENTOR.
Joseph Mihalyi
ATTORNEYS May 17, 1938.    J. MIHALYI    2,117,971
CAMERA SHUTTER
Filed Oct. 30, 1936    6 Sheets-Sheet 5
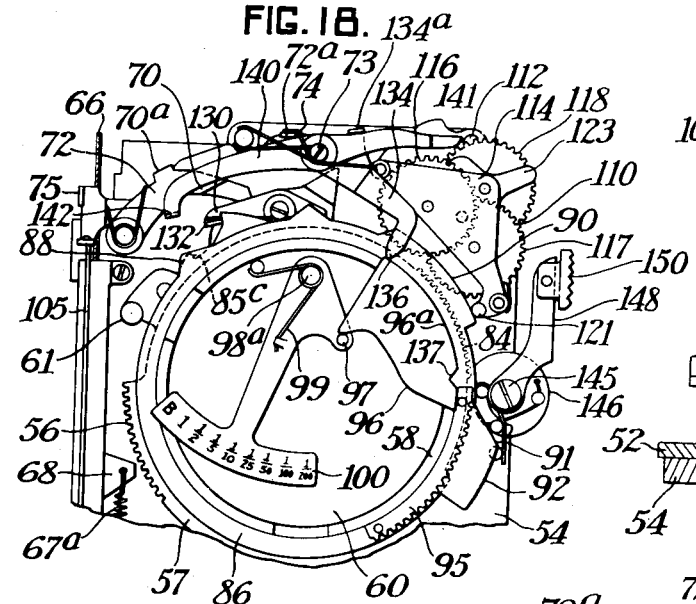
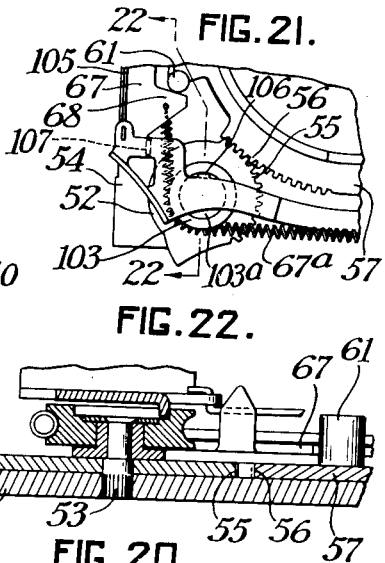
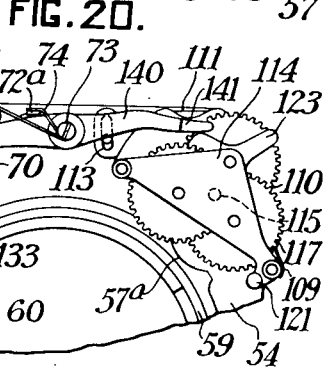
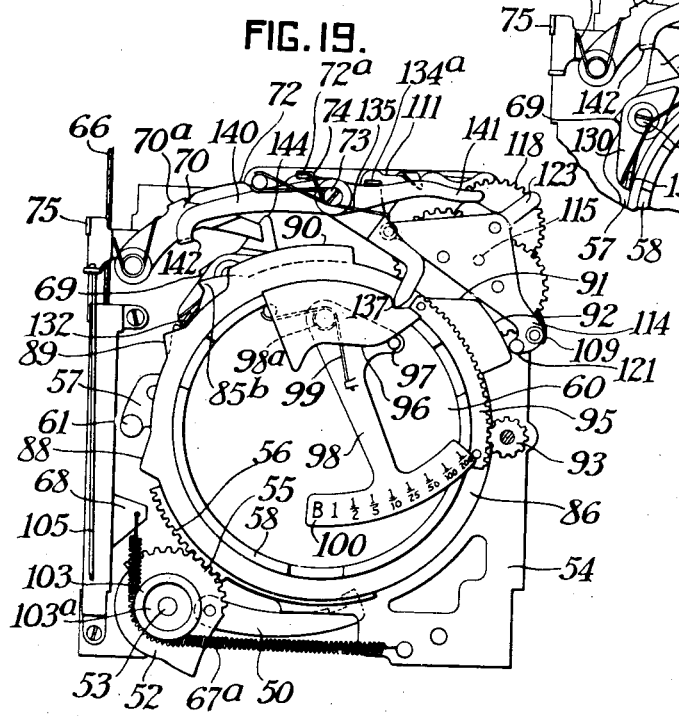
INVENTOR.
Joseph Mihalyi
BY
ATTORNEYS

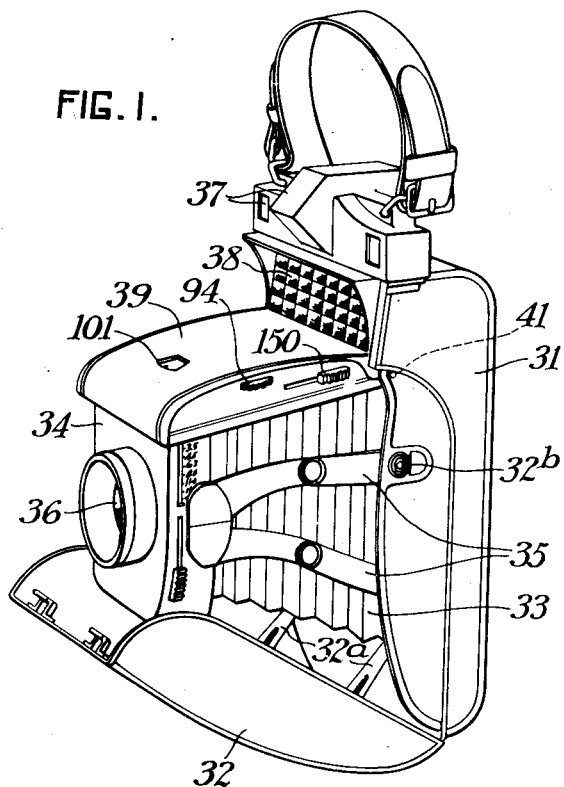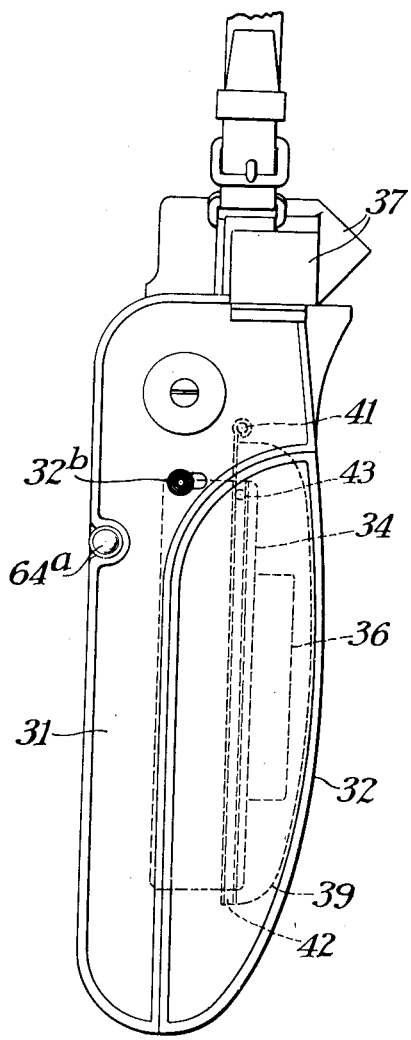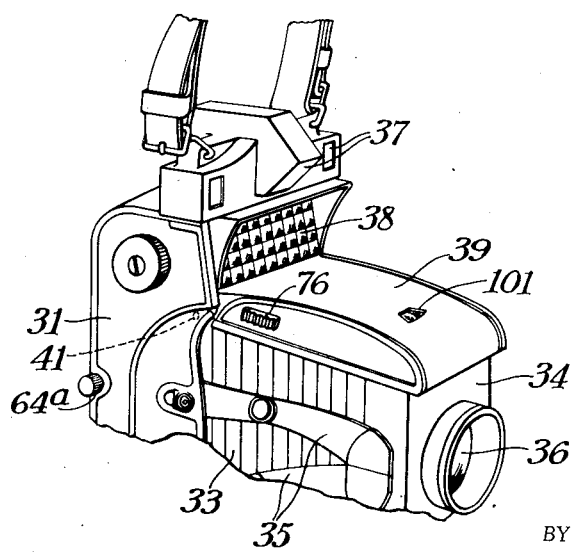

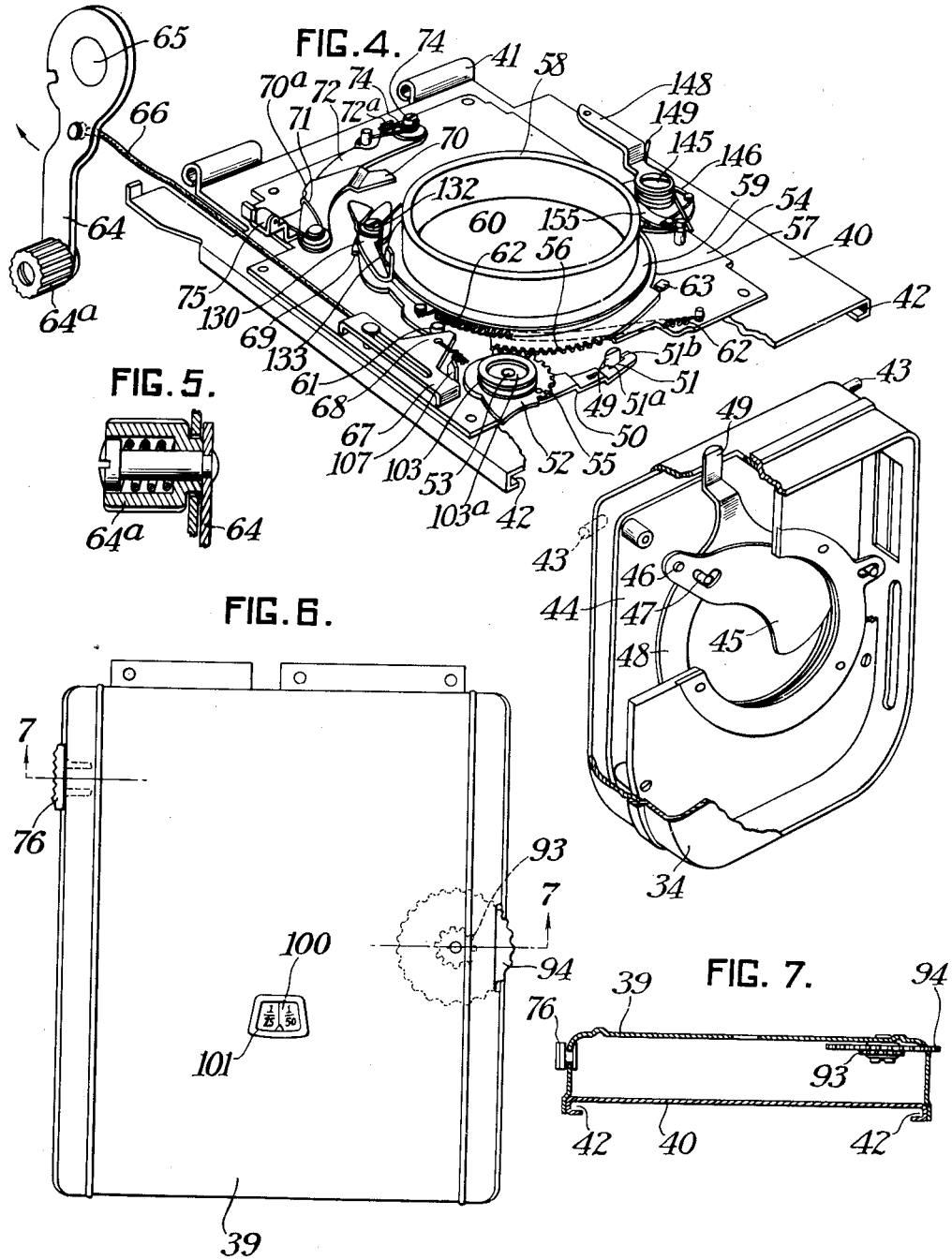

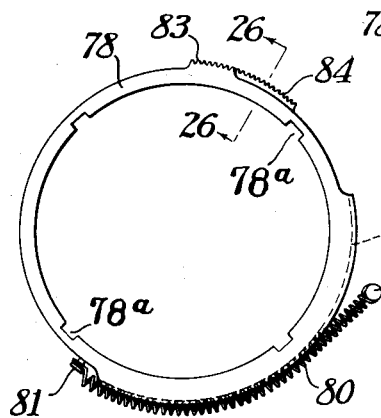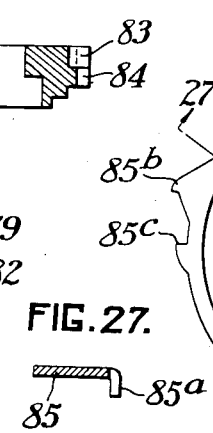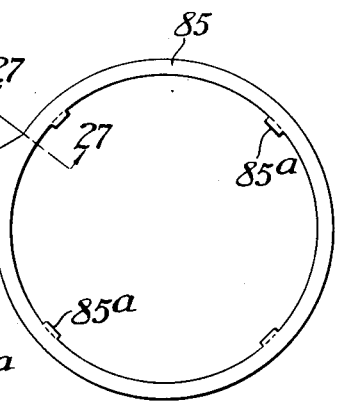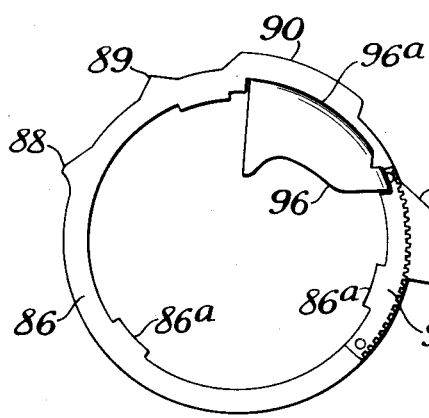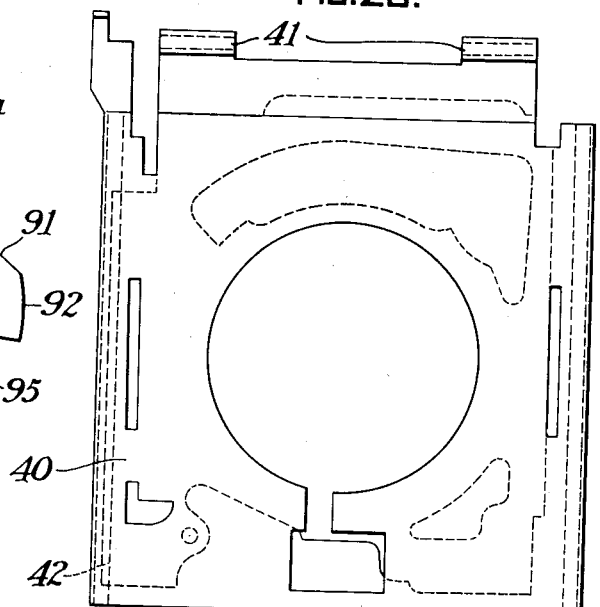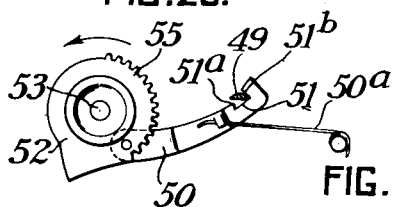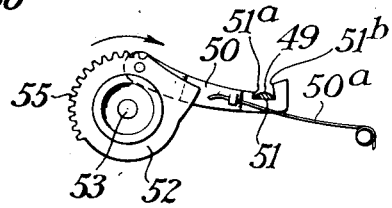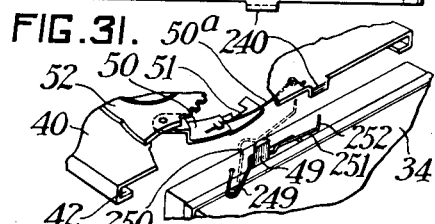

Patented May 17, 1938

2,117,971

UNITED STATES PATENT OFFICE 2,117,971

CAMERA SHUTTER

Joseph Mihalyi, Rochester, N. Y., assignor to Eastman Kodak Company, Rochester, N. Y., a corporation of New Jersey Application October 30, 1936, Serial No. 108,396

20 Claims. (Cl. 95—63)

This invention relates to photography, and more particularly to shutters for cameras. One object of my invention is to provide shutter mechanism arranged in two separate housings which are foldable relative to each other. Another object of my invention is to provide shutter mechanism in two separate housings, interengaging parts of which are adapted to be automatically positioned in operative relation by opening the camera. Another object of my invention is to provide a photographic shutter in which that part of the shutter mechanism which is required to control the light beam passing through an objective is mounted on a part carrying the objective, and that part of the mechanism which controls the speed and duration of exposure is mounted in a housing movable relative to the part carrying the objective. Another object of my invention is to provide a shutter for cameras in which the more expensive part of the shutter mechanism which is used for controlling the duration and type of exposures may be mounted as one unit, and the parts which are required for the objective, such as the shutter leaves and diaphragm, are mounted in a second unit, so that a second unit can be furnished to operate with the first unit, regardless of the focal length and aperture of the camera objective to be used. Another object of my invention is to provide a shutter which is particularly adapted for use with objective of different focal lengths and apertures, and which is provided with two separate parts, one of which only must be fitted to the particular objective in use. Another object of my invention is to provide a shutter leaf structure, separate from the shutter leaf operating structure. Another object is to provide a means for holding the shutter leaves definitely closed except when the shutter leaf structure is operably connected to the leaf operating structure. Another object of my invention is to provide a camera of a folding type with a shutter in which one of the setting dials is visible from a position above the camera when the camera is in an open or picture-taking position, and other objects will appear from the following specification, the novel features being particularly pointed out in the claims at the end thereof.

Coming now to the drawings, wherein like reference characters denote like parts throughout:

Fig. 1 is a perspective view of a camera in which is embodied the shutter operating mechanism constructed in accordance with this invention, the camera being opened for use.

Fig. 2 is a fragmentary perspective view of the upper portion of the same camera as Fig. 1, but viewed from the opposite side;

Fig. 3 is a side elevation of the camera in closed position;

Fig. 4 is a perspective view of the mounting plate on which the operating mechanism is mounted, only certain parts of the latter being shown, and also showing parts of the shutter and shutter casing;

Fig. 5 is a vertical section through the end of the winding lever shown in Fig. 4;

Fig. 6 is a plan view of the cover for the shutter operating mechanism;

Fig. 7 is a section on line 7—7 of Fig. 6, the operating parts not being shown;

Fig. 8 is a plan view of the operating parts and the plate on which said parts are mounted, the mechanism being in released position and some parts omitted;

Fig. 9 is a similar view showing the same parts as Fig. 8, but in the "set" or "wound" position and with the "delayed action" device also ready for release;

Figs. 10 and 11 are section elevations on lines 10—10 and 11—11 of Fig. 9 and Fig. 8, respectively.

Fig. 12 is an enlarged plan view of the "delayed action" detent and associated parts;

Fig. 13 is a plan view of the operating mechanism, with some parts omitted, after "release", and about to make an exposure in the range of $$\frac{1}{100} \text{ to } \frac{1}{5}$$

of a second;

Fig. 14 is a similar view for exposures of 1 second and ½ second;

Fig. 15 is a plan of a bellcrank that is part of the timing control;

Fig. 16 is a detached view of the timing gears and the mounting therefor;

Fig. 17 is a sectional elevation on line 17—17 of Fig. 16;

Fig. 18 is a plan view similar to Figs. 13 and 14, with more of the operating parts shown, and operating to make exposures of 1/200 second;

Fig. 19 is a plan view, showing "bulb" operation;

Fig. 20 is a fragmentary view indicating the manner in which overrun of the timing gears is prevented;

Fig. 21 is a fragmentary plan showing a detent;

Fig. 22 is a sectional elevation on line 22—22 of Fig. 21;

Fig. 23 is a detail of the timing-gear operator;

Fig. 24 is a detail of the control member for timing;

Fig. 25 is a detail of an auxiliary control member associated with the part shown in Fig. 23;

Fig. 26 is a section on line 26—26 of Fig. 23;

Fig. 27 is a section on line 27—27 of Fig. 25;

Fig. 28 is a plan view of a plate for attaching the shutter mechanism and its mounting to a part of the camera;

Fig. 29 is a detail of the shutter lever and actuator in released position;

Fig. 30 shows the same parts in "set" position; and

Fig. 31 is a detail fragmentary perspective view of parts of the interengaging shutter mechanism and particularly the shutter leaf holding latch.

Photographic shutters have always been one of the most expensive parts of a camera and the most difficult to make. One of the reasons for this is that heretofore shutters have been made in one unit, and that unit must be of the proper size and shape for the individual objective to be used. Thus, since objectives of varying focal length and aperture are in use on different cameras, it is necessary to provide a plurality of different sizes of shutters and moreover the parts in some shutters are confined in an extremely small space.

In accordance with my invention, I propose to provide a shutter formed of two units, each unit of which can be separately assembled and only one unit of which need fit the particular type of lens employed. For instance, I find it convenient to provide a camera front with shutter leaves and with a diaphragm and only such other parts as are necessary to move these two members, because by doing this an inexpensive unit is formed which can be made in different sizes to fit the various different objectives.

The second unit may be made in one size only if desired, and may contain all the mechanism by which the shutter leaves and diaphragm are operated. Such a unit can be made to work satisfactorily with various different sizes of objectives, and since this unit can be manufactured separately a much less expensive type of shutter can be provided for various objectives and cameras.

I propose to provide a shutter in two units and mount it in such a way that when the camera is opened, operative parts of the shutter mechanism contained in each unit will be automatically brought together so that the mechanism in the two units may function as satisfactorily as if all of the mechanism was mounted in a single casing.

As a preferred form of my invention I have illustrated a camera in which the shutter leaf and diaphragm construction is mounted in one unit and in which the mechanism for operating these parts are mounted in a separate unit, the two units being operative engaged by positioning the camera parts in a picture-taking position.

It is obvious that various different arrangements can be made without departing from my invention, and that the camera and shutter mechanism shown in the drawings are by way of illustration only.

Figs. 1, 2 and 3 show a camera including an embodiment of my invention, which may comprise a body 31, bed 32, bellows 33, and a camera front designated broadly as 34 and which is attached by conventional spring-actuated linkage 35 to the body 31. Such a structure is shown in U. S. Patent No. 2,033,703, Green, granted March 10, 1936. A lens 36 is mounted in the casing 34 in conjunction with the shutter, and bed braces 32a restrict the unfolding movement of the camera to a predetermined limit. Accurate focusing may be accomplished by rotating the front lens element in the usual manner. The camera may have a range finder 37 and a light-activated element 38 for determination of exposures, but these parts are not necessary parts of the present invention.

Above the bellows 33 is the casing or cover above mentioned, broadly designated by numeral 39, and containing the operating and controlling mechanism by which the shutter is operated. This casing, shown in section in Fig. 7, is closed at the bottom by a plate 40 (see also Fig. 4) that constitutes a base or mounting for the shutter-operating mechanism as a unit. The plate 40 is hinged at 41 to the camera body 1, and has edge channels or slideways 42 in which pins 43 on camera front 34 are adapted to slide, so that when the camera front 34 is pushed back in closing the camera, the pins 43 travel in the channels 42 and cause the plate 40 and casing 39 to swing downwardly on the hinge 41 over the shutter casing 34, the whole moving to the position indicated in Fig. 3 so that the camera bed 32 closes into place over both the casings 39 and 34.

When the bed 32 is released by pressure on buttons 32b the reverse action occurs, viz; the linkage 35 moves the shutter casing forwardly, and the pins 43 on the latter, traveling in the channels 42, cause the plate 40 and the operating parts carried thereby and the casing 39 that encloses said parts to swing upwardly about the hinge 41 and to assume the position of Fig. 1, at which time a predetermined mechanical relation is established between a part of the operating mechanism within the casing 39 and a part of the shutter that projects upwardly from the casing 34, all as set forth in detail in the following description.

The shutter in the present instance is not shown completely but only to the extent required to make clear its operation and its relation to other parts. Such a shutter may comprise a plurality of blades 45, pivotally attached at 46 to a partition 44 within the casing 34, and adapted to be moved by pins 47 that are set in a blade-operating ring 48, the latter suitably mounted for partial oscillation both clockwise and counterclockwise through a limited arc. One of such movements of the ring 48 may carry the blades 45 to open position and the opposite movement may return the blades to closed position.

For this purpose the blade-operating ring 48 has an upwardly-extending arm 49 that projects through a slot in the top of casing 34 and is adapted to cooperate with a reciprocating link 50 which constitutes a terminal element of the actuating mechanism, said link being moved when the operator presses the "release" or operating button for making an exposure, in a manner to be described. It will be understood that the opening of the camera as above described carries the arm 49 into a position where it may be engaged by the link 50. This movement is completely automatic and requires no effort on the part of the operator other than merely opening the camera.

Suitable means are provided whereby the arm 49 is held against movement, (the blades 45 being closed) when the camera is folded or partially opened, so that the blades will not work open or become separated by movement or jarring of the camera. Such means may comprise a spring 249 with a curved portion 250 adapted to hold lever 49 against movement at the time this part is free from engagement with the hook or latch 51, which is when the camera front 34 is in a folded or partly folded position.

When however the camera is positioned for taking pictures and member 49 is engaged by hook 51 the arm 49 will have been released since lug 240 of plate 40 engages the upstanding end 252 of spring latch 251 just before the camera is fully opened, so that by completing the opening movement the latch is released. In starting to fold the camera the latch is immediately released to immediately re-engage arm 49 to hold it and the shutter leaves 45 against movement.

Coming now to the mechanism for reciprocating the arm 49, (opening and closing the shutter) the link 50 (Figs. 4, 29 and 30) having a notch 51 near one end, is pivotally attached near the edge of a disc 52, revoluble on a post 53. This post is set in a mounting plate 54 that also carries the other operating parts, said plate being attached to the base plate 40.

The disc 52 has teeth 55 around part of its periphery, said teeth being adapted to mesh with teeth 56 on the rim of a ring member 57. This ring member, hereinafter designated the "driver" constitutes a convenient form of prime mover for all the operating and controlled parts of the mechanism. The ring 57 is revolubly mounted on a circular collar 58 (Fig. 11) beneath a flange 59. A central opening or well 60, inside the ring 58, provides a space to receive the front lens element 36 when the camera is closed as in Fig. 3, and this well may have a closure such as the plate 60a. All the operating and controlling parts are disposed about this central collar, some being mounted to rotate on said collar and others being mounted on various posts or studs set in the plate 54, as will presently appear.

The driver 57 carries a pin 61 that constitutes a convenient means for engagement with the "winding" or "setting" elements. Movement of the driver in a clockwise direction by the setting elements (presently to be described) is opposed by a spring 62, that constantly tends to move the driver in a counter-clockwise direction and to return it to the position of Fig. 4 to a stop pin 63. Movement of the driver in a clockwise direction rotates the disc 52 in a counter-clockwise direction, thereby actuating the link 50 alternately through a right-to-left and left-to-right path in accordance with such movement, while movement of the driver counterclockwise actuates the link 50 from left-to-right and then from right-to-left.

The setting element for the shutter mechanism is preferably a lever 64 which may be mounted at 65 on an extension of the film spool key and may therefore constitute a film winder also. This lever 64 is shown as connected by a flexible cable 66 with a slide 67 that has a lug 68 lying against the pin 61. The slide 67 is normally pulled toward the disc 52 by a spring 67a. When the lever 64 is moved in the direction indicated in Fig. 4, the slide lug 68 engages the pin 61, and the driver is rotated clockwise until a step 69 on its periphery passes a latch 70.

This latch, pressed toward the driver by a spring 71, is mounted on a lever 72, hereinafter referred to as the release lever, which is pivoted on a post 73 and urged in a counter-clockwise direction about the post 73 by a light spring 74. A fork 75 carries a finger piece 76 that extends through the side wall of casing 39, (Figs. 2 and 6) so that a movement of the finger piece 76 toward the camera lifts the latch 70 from the step 69 and permits the driver 57 to be rotated counter-clockwise by the spring 62, except as said driver may be interrupted or delayed for extended exposures, later to be described.

The manner in which the shutter arm 49 is engaged and moved to open and close the shutter when the driver is set and released is a particular feature of the invention and will now be described.

From Figs. 29 and 30 it will be noted that the notch 51 in the free end of link 50 is of a peculiar shape, the notch being "undercut" and being deeper on the outer side than it is on the side toward the disc 52. Fig. 29 shows said disc and the link as they appear when the driver 57 is in the position of Fig. 4. If now the lever 64 is moved, carrying the slider 67 toward the camera, the driver turns the disc 52 counter clockwise. The link 50 then moves toward the right, the shoulder 51a at the left of notch 51 passing in front of arm 49 because the link approaches the arm 49 at an acute angle, and therefore no movement of said arm occurs. As the disc 52 continues to move, the link pivot passes the right center and the link 50 then begins moving toward the left, the shoulder 51a again passing in front of arm 49 but still not engaging said arm. The free end of link 50 is lightly pressed toward the arm 49 by a spring 50a. When the driver is released (the parts being in the position of Fig. 30) the disc 52 is rotated clockwise by reason of its toothed connection with the driver, and the shoulder 51a at the left of the notch 51 then approaches the arm 49 in a direction normal to the edge of said arm thus engaging and moving the latter toward the right and opening the shutter as heretofore described. As the driver moves further toward its released position or to rest, the disc 52 continues to rotate clockwise, and the link, after its pivot has passed the right center, moves again toward the left, and the shoulder 51b at the right side of the notch 51 carries the arm 49 to the left and closes the shutter. The parts are then again in the relative positions of Fig. 29.

The above described engagement occurs regardless of the selected timing of the operating mechanism, so that on slow or "bulb" exposures the driver is so controlled that the shutter remains open, i. e.: the driver 57 and the disc 52 are stopped when the arm 49 has been moved to the right, and the shutter closes when the time-delayed parts are released to complete their movement.

To afford the operator convenient control of shutter speeds, the mechanism shown as embodying the present invention is arranged to permit speeds of "bulb", 1 second, 1/2, 1/5, 1/10, 1/25, 1/50, 1/100 and 1/200 second, to encompass the conventional range of requirements. For a better understanding of the operating mechanism, the construction and assembly only of the timing and control groups of parts will now be described and their operation and functions will be set forth thereafter.

Referring first to Figs. 10 and 11, the driver or master operating ring 57 is shown as before described, underlying an annular flange 59 on the central rim or collar 58. Upon the top face of this flange 59 is a number of balls 77, which constitute an anti-friction bearing for a ring 78, hereinafter designated as the "gear ring." Part of the periphery of this ring is grooved as at 79 (see Fig. 23) to receive a spring 80 that is attached to the ring at 81 and to a post on plate 54. The spring 80 thus tends to rotate the gear ring 78 counterclockwise, after the manner of the "driver" 57 with its spring. Ring 78 carries two gear segments 83 and 84 which are in different planes, the segment 83 being uppermost.

Lying upon the gear ring 78 is a flat ring 85, hereinafter called the "detent ring." It would be possible to have this ring (shown in Fig. 25) an integral part of ring 78, but for practical and less expensive construction it is of thinner metal and has downturned lugs 25a that enter notches 78a in the gear ring 78, thus making the parts 78 and 85 in effect a single member. The periphery of this detent ring is provided with detents 85b and 85c.

To retain the above described rings in rotative relation and to facilitate assembly, a third ring member 86, hereinafter referred to as the "cam" ring overlies the detent ring 85 and has lugs 86a (Fig. 24) adapted to enter notches 87 in the rim or collar 58 and engage an annular groove 58a therein, thus permitting the ring 86 to be retained on said collar, at the same time being free to revolve through a limited arc. As the lugs 86a cannot escape from the groove 58a unless aligned with the notches 87, the cam ring 86 retains both the detent ring 85 and the gear ring 78 in their respective planes. The circumferential traverse of the cam is such that the required arc is covered by a movement which is insufficient to carry the lugs 86a from one of the notches 87 to the next.

The "cam" ring 86 constitutes a controlling element which acts upon other parts to move or interrupt the movements thereof to time varying exposures, and to this end the cam ring is provided with outwardly extending portions of appropriate form, 88, 89, 90, 91 and 92, the functions of which will be described. Rotation of the cam ring is accomplished by means of a pinion 93 (Fig. 19), mounted on a knurled wheel 94 (Fig. 7) projecting through the cover 39 convenient to the operator's finger. The pinion 93 meshes with a gear segment 95 on the cam ring 86, so that movement of the wheel 94 may turn the cam ring either clockwise or counterclockwise.

The cam ring 86 also carries an inwardly projecting irregular portion 96, hereinafter referred to as the "index cam." A lever 98, pivoted at 98a, has an upstanding pin 97 that is held against the index cam by the action of a spring 99. The outer end of lever 98 carries scale 100 indicating shutter speeds, and this scale may be observed through a window 101 in the cover 39 (see Figs. 1 and 6). Rotation of the wheel 94 causes the scale 100 to move under the window 101.

The parts which cooperate with the gear ring 78 are best understood by reference to Figs. 13 to 17 inclusive, and include as a principal member a gear train with a retarding escapement, all of which, broadly designated by reference numeral 110, is in the present instance located near the rear right rear corner of the plate 54. This gear train as a unit is carried on a bell-crank 111 pivoted at 112, and having an arcuate slot 113 to limit its movement. A double yoke or rocker frame 114 is pivoted at 115 on the bellcrank 111, and is pressed by a spring 109 in such a manner that it tends to turn clockwise on said pivot. Between the upper and lower yoke members are gears 116, 117, 118, and pinions 119 and 120, which intermesh successively after the manner of clockwork gears, that is, so that movement of the primary gear, in this instance, 116, is carried through pinion 120, gear 117, pinion 119 to gear 118, which latter will then revolve many times faster than the primary gear 116.

To limit the speed of the gear train under various conditions, the same elements are employed as are commonly in use in clocks and watches, viz; a star wheel or ratchet 122 that revolves freely on the shaft 116a of gear 116, and an "anchor" escapement pallet 123, pivoted on the shaft of gear 118. The star wheel 122 carries a pinion 124 that meshes with the gear 118, and is thus driven at a higher speed than the latter. The pallet 123 therefore co-acts with the fastest-moving element of the gear train and constitutes a retarding element therefor.

The gears 116 and 117 lie in the same planes, respectively, as the toothed segments 83 and 84 on the gear ring 78. When the yoke 114 is turned slightly counterclockwise about the pivot 115, the gear 116 will mesh with the segment 83, and the entire train of gears will be driven as above described, if the gear ring 78 is then moved counterclockwise. If the yoke 114 is turned slightly clockwise about the pivot 115 the gear 116 is moved to a position where it cannot engage the segment 83, the gear 117 being brought into position to engage the segment 84, so that movement of the gear ring 78 then drives the gear train through a smaller reduction and therefore against less resistance and at a higher speed. The yoke or frame 114 is turned about the pivot 115 by the cams 91 and 92, acting on a pin 121 at the ring end of said frame.

If the gear train is considered as a brake upon the movement of the gear ring 78, it is obvious that the latter, urged counterclockwise by the spring 80 (under conditions hereinafter to be set forth) will be retarded for a greater length of time when the gear segment 83 and the gear 116 are in mesh than will be the case when the segment 85 and gear 117 are engaged. The above factors are utilized in the operating mechanism herewith illustrated to hold the shutter open for longer or shorter intervals, as will be described. The gear train therefore constitutes a variable retarding element co-acting with the shutter-actuating mechanism.

Referring to Fig. 9 it will be noted that the driver 57 carries a short lever 130, pivoted at 131 and having an upstanding arm 132 that projects above the plane of cam ring 86. A spring 133 tends to hold the arm 132 against the edge of the rings 85 and 86. The arm 132 constitutes a connector between the driver 57 and the rings 78 and 85 whereby both the latter are moved clockwise when the driver is moved to the "set" position, and said arm also serves as a means for releasing the rings 78 and 85 when the lever 72 is moved. The setting movement of the driver places springs 80 and 62 under tension so that the driver 57, the gear ring 78 and the detent ring 85 will be moved counterclockwise except as such movement is retarded or interrupted.

Pivoted on the stud 73 is a lever 134, urged by a spring 135 so that its end 136 is pressed against the outer edge 96a of the index cam 96. A notch 137 in the edge 96a is adapted to permit the lever 134 to move, under the action of spring 135, a sufficient distance to co-act with other members to give a "bulb" exposure, provided the cam ring 86 is so positioned that the end 136 of lever 134 may enter the notch 137.

Also pivoted on stud 73 is a lever 140, the function of which is to intercept the escapement pallet 123 at the end of the shutter-closing movement, so that the gear train will not "overrun" by its own momentum. The operation of this part will be detailed later. One end 141 of lever 140 is in proximity to pallet 123, and the other end of the lever is turned down as at 142, so that it may be struck by a projection 144 on the driver 57. The lever 140 also may be moved counterclockwise by an arm 72a on the lever 72.

Means are also provided in the structure of the present invention whereby the operator may release the shutter, and then may himself pose in front of the camera before the shutter opens. Such means may be properly referred to as a "delayed action" device, because the shutter is not operated until a predetermined time interval has elapsed after its release. The parts for accomplishing this delayed action in the present instance are located at the right side of the operating mechanism, and are best illustrated in Figs. 8 and 9 and enlarged in Fig. 12.

A stud 145 carries a detent 146, in the form of a disc, cut-away at 147 to approximately the radius of the periphery of driver 57 and occupying a corresponding plane. Obviously the detent 146 cannot be turned when so positioned. A part of the periphery of the driver has a curved recess 57a, which, when the driver is moved to the "set" position (Fig. 9) permits the detent 146 to be turned, and when the detent is so turned, the driver can be moved only a very slight distance. The delayed action device therefore cannot become operative until the shutter mechanism has been set. Detent 146 may be turned, when the shutter mechanism is set, by an arm 148, against the action of a spring 149. A fingerpiece 150 projects through the side of the cover 39 (Fig. 1) for the operator's convenience.

A link 151 (Fig. 9) is pivotally attached at 152 to the underside of detent 146 and has on its free end a series of teeth 151a adapted to mesh with a pinion 153 that is fixed to the shaft 116a of gear 116. A light spring 154 maintains the teeth 151a in engagement with pinion 153. On the upper face of detent 146 is a pawl 155, the free end of which is urged outwardly by a spring 156 against a limit stop 157.

The operation of the delayed-action device is as follows:

From a position of rest, as shown in Fig. 8, the driver 57 is moved clockwise as has been described, by means of the slider 67, until the "set" position has been reached, and the step 69 on the driver is caught by the latch 70 as in Fig. 9. At this time the recess 57a in the driver is aligned with the cut-away portion 147 of detent 146, and the latter may be turned by the arm 148 to the position of Fig. 9, at which time the pawl 155 snaps outwardly and acts as a latch against one shoulder of the recess 57a, preventing detent 146 from rotating under the pressure of spring 149. During this movement the teeth 151a on link 151 pass by the teeth on pinion 153 without turning the latter, because spring 154 is not stiff enough to cause such engagement, as will be obvious when the relative positions of the link 151, its pivot 152, and the pinion 153 are considered.

When the release lever 72 is tripped by means of the fingerpiece 76, and the latch 70 is thus disengaged from the driver, the driver spring 62 pulls the driver around, counterclockwise, but the driver can only move a very slight distance, because the front half of recess 57a immediately strikes the detent 146 and the driver stops. However, this slight movement is sufficient to carry the rear end of recess 57a past the end of pawl 155, whereat the spring 149 begins to rotate disc 146 counterclockwise and the teeth 151a engage the pinion 153, due to the "jamming" action that occurs because of the relative positions of the parts. The action of the spring 149 is resisted by the inertia and the escapement of gear train 110, so that the restricted speed of the latter compels the detent 146 to revolve slowly, giving the operator time to pose in front of the camera. As the detent 146 continues to revolve, it finally comes again to the position of Fig. 8, where it no longer obstructs the driver 57, and the latter therefore is free to complete its movement and to open and close the shutter for instantaneous or slow speeds.

Having described the arrangement of the operating mechanism and the construction of the parts thereof, the action of these parts in performing their various functions through different lengths of exposures now will be set forth in detail. First, the shutter operating mechanism will be considered as ready for making a "slow" automatic exposure, for instance within the limits of one second to about ¼ second.

The selected index figure having been moved to the center of the window 101 by the operator turning the wheel 94, the cam or control ring 86 is then in the position of Fig. 14 with the pin 121 on the part 92. The operator then winds or "sets" the operating mechanism by turning the crank-arm 64, thus moving slider 67 toward the camera, and carrying the driver 57 (through contact between slider lug 68 and pin 61) clockwise, until the nose or step 69 on the driver passes the end of latch 70. The handle 64 is then returned to the position of rest, in the socket provided for it in the camera body 31 (Fig. 2).

As the driver 57 is turned as just described, the upstanding arm 132 on the part 130 engages the detent 85b on the ring 85, so that the latter and the "gear ring" 78 are moved clockwise also. This movement places the springs 62 and 80 under considerable tension. At the same time, the cam 92 is in contact with pin 121 and has swung the gear train 110 about the pivot 115 so that gear 116 's meshed with the segmental gear 83, thus placing the gear train so as to offer the greatest resistance and to require the longest time for the gear ring to turn and run the segment 83 past the gear 116 in a counterclockwise direction. This latter action occurs when the release lever 72 is moved toward the camera, lifting the latch 70 from the nose 69 on the driver 57.

As the driver 57 starts to move counterclockwise it carries the lever 130, and therefore the arm 132, ahead of the detent ring 85, because the latter is fully retarded by the drag of the gear train 110. Thus, the arm 132 is immediately pulled away from the detent 85b, and against the detent 85c, and the shutter 45 is opened by the action of link 50 through arm 49 as previously described. As the spring 80 continues to pull the gear ring 78 around, the detent 85c, with the arm 132 following against it under the action of spring 62, moves past the cam point 89. This cam point forces the arm 132 clear of the detent 85c, and the spring 62 immediately pulls the driver to its terminal position, carrying the link 50 to the left and closing the shutter. Fig. 14 shows the mechanism just as the arm 132 is being forced off from the detent 85c by the cam point 89, with the driver in such a position that the link 50 is about to move the arm 49 of the shutter to the left to close it.

For exposures of somewhat higher speeds, from 1/5 second to 1/100 second, the cam ring 86 is set so that the pin 121 on the gear train frame is resting against the angular edge 91. This permits the gear train frame to turn clockwise on the pivot 115 and thus to remove the gear 116 from the path of segment 83 and to move the gear 117 into the path of segment 84. If now the shutter mechanism is set as described, then released, the gear ring 78 will be retarded for a shorter period than before, due to the fact that a lower gear ratio is in effect. The gear 116 spins idly and does not drive the train. This period becomes shorter the farther the cam ring 86 is turned clockwise, until, when the pin 121 lies between the portions 90 and 91 of the cam ring the time of "dwell" of the arm 132 after leaving the detent 85b until it passes over the cam point 89 is as short as 1/100 second.

For a speed of 1/200 second, the cam ring is moved until pin 121 rides on the portion 90, which swings the entire gear train and the bell crank 111 so far to the right about the pivot 112 that the gears 116 and 117 cannot touch the segments 83 and 84. As all gear inertia or retarding effect is thus eliminated, the gear ring is free to move under the influence of spring 80 as soon as the latch 70 is released from the driver. The cam point 89 is at this time to the right of the arm 132 and of no effect. The arm 132 is not carried ahead of detent 85b, because the spring 80 causes the gear ring to travel as fast as the driver, so that the latter is really aided by the spring 80. The cam point 88 is so close to the arm 132 that the latter is "kicked off" and will not strike the detent 85c. The shutter is thus opened and closed at maximum speed, the open time being in proportion to the initial "lead" of the cam point 88 from the position of arm 132 in the latched position.

The operation of the mechanism for a "bulb" exposure brings into action the lever 134 and other parts heretofore described. The point 136 of lever 134 is pressed toward the cam surface 96a by a light spring 135. A lug 134a on the lever lies against the free lever 140 which is pivoted at 73, and as the left end of the lever 140 is carried forward by release lever 72 it prevents the point 136 from touching the cam surface 96a except when lever 72 is pulled to release position. If the notch 137 is opposite the point 136 the latter will enter the notch when the lever 72 is moved as aforesaid. This movement frees the lever 140 and permits it to be swung about its pivot by the lug 134a as lever 134 moves under the influence of spring 135. The right end 141 of lever 140 then rests upon the rocking escapement pallet 123, preventing it from oscillating, so that the pallet prevents the gear train 110 from moving.

As the gear 116 is meshed at this time with segment 83, the gear ring 78, and therefore the detent ring 85, are held stationary, the arm 132 having moved from detent 85b to 85c with the driver during the opening movement of the shutter, is held by the stop ring, and the shutter remains open until the lever 72 is returned to normal by its spring 71. As soon as this occurs, lever 72 turns the lever 140 and raises its end 141 clear of the pallet 123. The gear train, free then to run, permits gear ring 78 and detent ring 85 to complete their movements with the driver 57 and the latter closes the shutter.

As previously mentioned, the end 141 of lever 140 engages the pallet 123 at every return or counterclockwise movement of the driver, through a point 144 on the latter striking the left end of said lever, and carrying the end 141 against the pallet 123. This action prevents the gear train from "overrunning."

It should be understood that during the setting movement or clockwise rotation of the driver and the gear ring, that the segments 83 and 84 on the latter do not engage the gears 116 and 117. Due to the fact that this movement tends to force the gears toward the right, the whole assembly swings, together with bell-crank 111, about the pivot 112, so that the segments 83 and 84 chatter across the gears without actually meshing. As the segments move to the left during the operating rotation of the driver, a jamming action occurs, due to the angular relation between the pivot 112 and the path of travel of the segments, so that the gears and the segments must mesh.

Means are provided whereby the operation of the mechanism embodying this invention is impossible unless the crank-arm 64 which is a combination film-winding and shutter-setting member is fully returned to its normal position with the reduced shank of knob 64a in the notch provided for it in the camera body 31.

A grooved disc or sheave 103 is freely revoluble on the post 53, and one function of said sheave is to serve as a guide for the spring 67a that retracts slider 67. Mounted at one side of the plate 54 is a pivoted arm 104 that overlies the sheave 103, the free end of said arm being connected to the end 75 of release lever 72 by a bar 105 (Fig. 13). The arm 104 has a lug 106 that projects into the annular recess 103a in the sheave, and when the lug 106 is so projected, the arm 104 and release lever 72 are held against movement in a plane parallel to the plate 54.

The front end of slider 67 carries an upstanding lug 107 that is beveled (Fig. 4) so that it may wedge under the end of arm 104. As the slider 67 moves to the extreme forward position, the lug 107 may thereby raise the arm 104 thus lifting the lug 106 out of the annular recess 103a in sheave 103. When the lug 106 is thus raised, the release lever 72 may be moved, but if the winding arm 64 has not been fully returned after a winding movement, the lug 107 will not pass under the end of arm 104. The latter then will not be lifted, and the lug 106 will still project into the recess 103a and prevent the lever 72 from being moved toward the camera to release the mechanism for operating the shutter.

I claim:

1. In a shutter for folding cameras including a camera body, the combination with a camera front adapted to support an objective, means for moving the front to and from a picture taking position, a casing hingedly attached to the camera body movable to and from a picture taking position, a two part shutter, one part carried by the front and including a shutter leaf structure, another part carried by the casing and including a power drive, and elements on the power drive and shutter leaf structure so positioned as to be brought into operative relationship for driving the latter from the former when the folding camera parts are in a picture taking position.

2. In a shutter for folding cameras including a camera body, the combination with a camera front adapted to support an objective, means for moving the front to and from a picture taking position, a casing hingedly attached to the camera body movable to and from a picture taking position, a two part shutter, one part carried by the front and including a shutter leaf structure and an operating member therefor, another part carried by the casing and including a power driven crank, a latch included in the crank and shutter leaf structure for driving the operating member to open and close the shutter leaves to make an exposure, the location of said camera front moving means and casing and camera hinge being such that said latch and operating member may be engaged by unfolding the camera parts into a picture taking position.

3. In a shutter for folding cameras including a camera body, the combination with a camera front adapted to support an objective, means for moving the front to and from a picture taking position, a casing hingedly attached to the camera body movable to and from a picture taking position, a two part shutter, one part carried by the front and including a shutter leaf structure and an operating member therefor, another part carried by the casing and including a power driven crank, the location of the hinge of the casing and the means for moving the front being such that said crank and operating member may be automatically connected by moving the parts to a picture taking position.

4. In a shutter for folding cameras including a camera body, the combination with a camera front adapted to support an objective, means for moving the front to and from a picture taking position, a casing hingedly attached to the camera body movable to and from a picture taking position, a two part shutter, one part carried by the front and including a shutter leaf structure, another part carried by the casing and including a power driven crank, a notch in the end of the crank, a pin carried by the shutter leaf structure positioned to lie in the path of the notch in the crank to automatically engage the notch as the casing and front are moved toward a picture taking position.

5. In a shutter for folding cameras including a camera body, the combination with a camera front adapted to support an objective, a casing hingedly attached to the camera body movable to and from a picture taking position, a two part shutter, one part carried by the front and including a shutter leaf structure, another part carried by the casing and including a power driven crank, a spring for moving the crank in one direction, a notch in the end of the crank forming one latch element, a pin on the shutter leaf structure forming the other latch element, said spring being adapted to resiliently engage the latch elements when the camera parts are moved to a picture taking position.

6. In a shutter for folding cameras including a camera body, the combination with a camera front adapted to support an objective, a casing hingedly attached to the camera body movable to and from a picture taking position, a two part shutter, one part carried by the front and including a shutter leaf structure, another part carried by the casing and including a power driven member including a gear, a pinion meshing with said gear and adapted to be oscillated thereby, a crank carried by said pinion and having a latch element on an end thereof, and a pin carried by the shutter leaf structure forming a second latch element through which the shutter leaves may be driven by the power drive.

7. In a shutter for folding cameras including a camera body, a camera front, a folding front mechanism for holding the front in parallelism with the camera body when the front is in an unfolded or picture taking position, a pair of hinged members mounted on opposite ends of the camera body and adapted to move from a position substantially parallel thereto to a picture taking position in which each member lies at an angle to the camera body and camera front and in which the hinged members lie on opposite sides of the camera front, whereby the camera front and the hinged members lie in different planes when the camera is in a picture taking position, a shutter mechanism divided into two parts, one part having mechanism including a power drive carried in one plane by one hinged member, another part of the shutter carried in another plane by the camera front and including shutter leaves and a shutter leaf moving member, and means for transmitting power from one shutter part to the other to drive the shutter leaves by the power drive including a member operated by the power drive and positioned on one end of the hinged member carrying the power drive and projecting therefrom, and the shutter-leaf moving member projecting from the camera front and into a position to engage the member operated by the power drive when the camera front and hinged member are moved to an open or picture taking position.

8. In a shutter for folding cameras including a camera body, a front mechanism for holding the front in parallelism with the camera body in a picture taking position, a pair of hinged members mounted on the camera body and adapted to move from a position substantially parallel thereto to a picture taking position at an angle to the body and camera front, whereby the camera front and hinged members lie in different planes when the camera is in a picture taking position, a part of a shutter including a power drive carried in one plane by one hinged member, another part of the shutter carried in another plane by the camera front and including shutter leaves, and means for transmitting power from one plane to the other to drive the shutter leaves by the power drive, said means including an interengaging hook and pin angularly disposed with reference to each other.

9. In a shutter for folding cameras including a camera body, a front mechanism for holding the front in parallelism with the camera body in a picture taking position, a pair of hinged members mounted on the camera body and adapted to move from a position substantially parallel thereto to a picture taking position at an angle to the body and camera front, whereby the camera front and hinged members lie in different planes when the camera is in a picture taking position, a part of a shutter including a power drive carried in one plane by one hinged member, another part of the shutter carried in another plane by the camera front and including shutter leaves, and means for transmitting power from one plane to the other to drive the shutter leaves by the power drive, said means including a hook lying in one plane, and a pin lying in another plane, both positioned for engagement by moving the camera parts to an operative position.

10. In a shutter for folding cameras including a camera body, a front, mechanism for holding the front in parallelism to the body in a picture taking position, a member hinged to the camera body and adapted to swing at an angle thereto when in a picture taking position and to be positioned with an end adjacent a portion of the camera front, a two part shutter mechanism, one part mounted in the front, and another part mounted in the angularly disposed member, elements on each shutter part adapted to cooperate when the camera is in a picture taking position, and a guideway adapted to guide one cooperating element into cooperative relationship with the other as the camera parts are moved towards a picture taking position, said guideway being of sufficient length to also guide said hinged member through movement of said front member.

11. In a shutter for folding cameras including a camera body, a front, mechanism for holding the front in parallelism to the body in a picture taking position, a member hinged to the camera body and adapted to swing at an angle thereto when in a picture taking position and to be positioned with an end adjacent a portion of the camera front, a two part shutter mechanism, one part mounted in the front, and another part mounted in the angularly disposed member, a pin projecting from one part, a hook projecting from the other part, and a guideway leading to the hook for directing the pin thereto as the camera parts are moved to a picture taking position, said guideway also controlling the movement of the hinged member through the movement of the front.

12. In a shutter for folding cameras including a camera body, a front, mechanism for supporting the front spaced from the body in picture taking position, a two part shutter, one part mounted in said camera front, a hinged housing adapted to swing upon the body to an angle in which an end of the housing lies adjacent an end of the camera front, said housing containing the other part of the shutter, and means in the ends of the housing and camera front for coupling the two shutter parts together, said means being adapted to be operative only when said camera parts are moved relative to the camera body and into a picture taking position.

13. In a shutter for folding cameras including the camera body, a front, mechanism for supporting the front spaced from the body in picture taking position, a two part shutter, one part mounted in said camera part, a hinged housing adapted to swing upon the body to an angle in which an end of the housing lies adjacent an end of the camera front, said housing containing the other part of the shutter, and means in the ends of the housing and camera front for coupling the two shutter parts together, including a pin and hook for coupling the two shutter parts together, a track included in said housing for guiding the pin into the hook as the front and hinged housing are moved toward a picture taking position.

14. In a two part shutter for folding cameras including an oscillatable film winding lever, the combination with a housing, a master member mounted in the housing, a setting member adapted to tension the master member, a crank operably connected to the master member to be moved in two directions thereby, said crank including a latch element, all of said shutter parts being mounted in a housing hingedly attached to the camera body, a blade ring, shutter leaves operably connected thereto and a blade ring operating lever, a camera front carrying said blade ring, shutter leaves and operating lever, said operating lever and latch element having a normal position of rest from which they may become automatically engaged by moving the housing hingedly attached to the camera body, and the camera front into engagement in an erect or picture taking position.

15. In a shutter for photographic camera of the folding type, the combination with shutter mechanism divided into two parts, two casings each adapted to contain a shutter part, each moveably carried by the camera and adapted to move into an operative or picture taking position in which they are in contact with each other, the shutter mechanism in one part including shutter leaves, and an arm for moving the shutter leaves, and moveable means for holding the arm against movement releasable by bringing the shutter casings in contact.

16. In a shutter for photographic camera of the folding type, the combination with shutter mechanism divided into two parts, two casings each adapted to contain a shutter part, each moveably carried by the camera and adapted to move into an operative or picture taking position in which they are in contact with each other, the shutter mechanism in one part including shutter leaves, and an arm for moving the shutter leaves, and moveable means for holding the arm against movement, including a spring latch normally engaging said arm, said latch being adapted to contact with a shutter casing so as to be moved out of latching position thereby as said shutter casings are brought into contact.

17. In a shutter for photographic camera of the folding type, the combination with shutter mechanism divided into two parts, two casings each adapted to contain a shutter part, each moveably carried by the camera and adapted to move into an operative or picture taking position in which they are in contact with each other, the shutter mechanism in one part including shutter leaves, and an arm for moving the shutter leaves, and moveable means for holding the arm against movement, including a spring latch normally engaging said arm, an upstanding lug on the spring lying in the path of one of the shutter casings to be moved thereby by bringing the casings into contact.

18. In a shutter for photographic camera of the folding type, the combination with shutter mechanism divided into two parts, two casings each adapted to contain a shutter part, each moveably carried by the camera and adapted to move into an operative or picture taking position in which they are in contact with each other, the shutter mechanism in one part including shutter leaves, and an arm for moving the shutter leaves, and moveable means for holding the arm against movement, including a lug on the other shutter casing lying in the path of the shutter holding means whereby said means may be moved to release the arm as the shutter casings are brought into contact.

19. A shutter for photographic cameras comprising two supports, one including an exposure aperture, shutter blades covering the aperture, means for operating the shutter blades including an oscillatable lever, a lever lock, the other support including shutter operating mechanism, a hook member for engaging the oscillatable lever, and means for moving the hook and lever into engagement and simultaneously releasing the lever lock.

20. A shutter for photographic cameras comprising two supports, one including an exposure aperture, shutter blades covering the aperture, means for operating the shutter blades including an oscillatable lever, a spring actuated lever lock, the other support including shutter operating mechanism, a hook member for engaging the oscillatable lever, and means for moving the hook and lever into engagement and simultaneously releasing the spring actuated lever lock.

JOSEPH MIHALYI.